US007586952B2

(12) United States Patent
Inazumi

(10) Patent No.: US 7,586,952 B2
(45) Date of Patent: Sep. 8, 2009

(54) PACKET TRANSMISSION SYSTEM, PACKET TRANSMISSION METHOD, DATA RECEPTION SYSTEM, AND DATA RECEPTION METHOD

(75) Inventor: Mitsuhiro Inazumi, Shiojiri (JP)

(73) Assignee: Seiko Epson Corporation (JP)

( * ) Notice: Subject to any disclaimer, the term of this patent is extended or adjusted under 35 U.S.C. 154(b) by 1093 days.

(21) Appl. No.: 10/965,003

(22) Filed: Oct. 14, 2004

(65) Prior Publication Data

US 2005/0111456 A1    May 26, 2005

(30) Foreign Application Priority Data

Oct. 16, 2003  (JP) ............................. 2003-356538
Aug. 6, 2004   (JP) ............................. 2004-230274

(51) Int. Cl.
H04J 3/24     (2006.01)
H04J 3/00     (2006.01)
G06F 11/00    (2006.01)

(52) U.S. Cl. ...................... 370/474; 370/476; 370/394; 714/50

(58) Field of Classification Search ........................ None
See application file for complete search history.

(56) References Cited

U.S. PATENT DOCUMENTS 6,700,871 B1 * 3/2004 Harper et al. ............... 370/235

7,349,400 B2 * 3/2008 Khirman ..................... 370/394
2004/0049612 A1 * 3/2004 Boyd et al. .................. 710/52

OTHER PUBLICATIONS

S. Floyd & T. Henderson "The NewReno Modification to TCP's Fast Recovery Algorithm", 12 pages (1999).
Information Sciences Institute, University of Southern California, "Transmission Control Protocol, DARPA Internet Program, Protocol Specification", 85 pages, 1981.
Postel "User Datagram Protocol", 3 pages (1980).

* cited by examiner

*Primary Examiner*—Edan Orgad
*Assistant Examiner*—Sori A Aga
(74) *Attorney, Agent, or Firm*—Harness, Dickey & Pierce, P.L.C.

(57) ABSTRACT

A packet transmission system is provided which successively sends source data from a sender unit after dividing the data into packets and sends a receipt acknowledgment in response to each packet sent from a receiver unit that has received the receive packet to the sender unit. The receiver unit has: a data position storage unit storing the data position of the received, already received packet on the source data; a data position comparison unit comparing the data position on the source data stored in the data position storage unit and the data position of the receive packet on the source data; and a receipt acknowledgment creation unit creating the receipt acknowledgment in a case where the data position comparison unit determined that the data position of the receive packet on the source data is behind the data position on the source data stored in the data position storage unit.

5 Claims, 14 Drawing Sheets

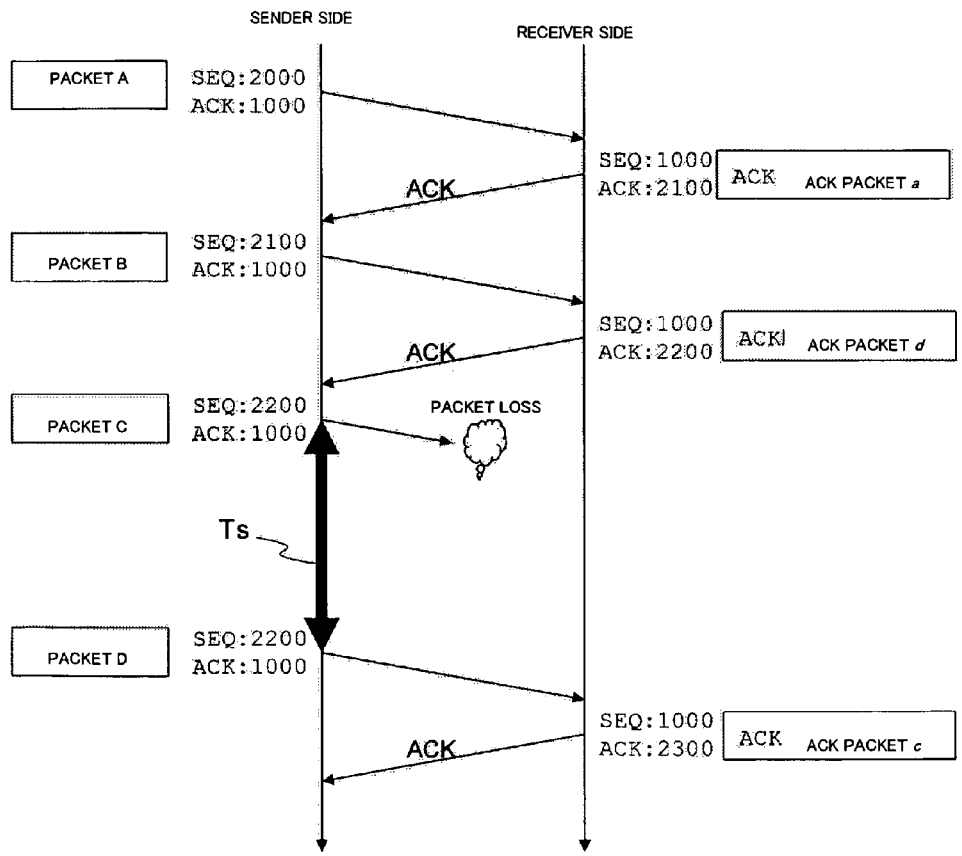

| STARTING POINT PORT NUMBER | ENDING POINT PORT NUMBER |
|---|---|
| PACKET LENGTH | CHECKSUM |

PACKET TRANSMISSION SYSTEM, PACKET TRANSMISSION METHOD, DATA RECEPTION SYSTEM, AND DATA RECEPTION METHOD

RELATED APPLICATIONS

This application claims priority to Japanese Patent Application Nos. 2003-356538 filed Oct. 16, 2003 and 2004-230274 filed Aug. 6, 2004 which are hereby expressly incorporated by reference herein in their entirety.

BACKGROUND

1. Technical Field

The present invention relates to a packet transmission system, packet transmission method, data reception system, and data reception method adapted for real-time transmission.

2. Background Art

Transmissions on networks such as the Internet are characterized in that they are packet type transmissions and that they are best effort transmissions.

Packet type transmissions (hereinafter referred to as packet transmissions) are characterized in that transmissions are made in units of data structures called packets. Each communicated packet contains data portions produced by dividing source data such as voice and additive information such as destination information.

Furthermore, the best effort transmissions are characterized in that the quality of transmission is not guaranteed. This means that neither the delay time with which sent packets arrive at their destinations nor the order in which they arrive are assured. In addition, the arrival itself is not assured.

An examples of a method of assuring the arrival of packets to their destinations include TCP (Transmission Control Protocol) that is a connection-oriented transmission protocol stipulated in IETF standard RFC793.

In packet transmission using TCP, a receipt acknowledgment packet (hereinafter referred to as the ACK packet) responding to the arriving data is sent from the receiver unit to the sender unit. Consequently, the sender unit can confirm that packets sent from the unit itself have arrived at the receiver unit. The packets will be retransmitted unless ACK packets arrive from the receiver unit. This can assure arrival of the packets at the destination. This is briefly described with reference to FIGS. 10 to 14.

FIG. 10 schematically illustrates additive information added to data (data to be sent such as voice) contained in individual packets used in TCP. Of these packets, sequence number (hereinafter referred to as SEQ number), receipt acknowledgment number (hereinafter referred to as ACK number), and window size (hereinafter abbreviated WIN) are especially associated with the description of the present invention.

FIG. 11 schematically illustrates simplified packet transmission operations using TCP regarding IETF standard RFC793. In FIG. 11, a packet sent first from a sender unit is referred to as packet A. SEQ:2000 of this packet A indicates that the SEQ number is 2000 and denotes the data position of the data contained in the sent packet on the source data.

Generally, data position on source data can be indicated by "SEQ number value of packet-initial value of SEQ number". For example, if the initial value of the SEQ number of the packet A is 0, the "SEQ:2000" of the packet A indicates that the data contained in the packet A is data items beginning with the 2000th byte from the head of the source data. The initial value of the SEQ is not limited to 0. In the following description, however, the initial value of the SEQ number is set to 0.

ACK:1000 of the packet A indicates that the ACK number is 1000. In this embodiment, that the ACK number is 1000 has no special meaning. In the following description, the position on the source data of data contained in each packet is referred to as the "position of the packet on the source data".

It is also assumed that the lengths of data items contained in packets sent from a sender unit to a receiver unit are all 100 bytes.

When the packet A is received by the receiver unit, the unit creates an ACK packet a as a receipt acknowledgment. The ACK packet a is sent to the sender unit. ACK:2100 of the ACK packet a indicates that the ACK number of the ACK packet a is 2100. In this case, the "2100" means that the SEQ number of the packet A is 2000 and that the length of the data contained in the packet A is 100. Hence, "2100" is their sum.

The "ACK:2100" means that the receiver unit requests the sender unit to perform transmission of a next data set beginning at data position of 2100, it being noted that the head position of the source data is set to 0. Alternatively, it means that the receiver unit has now received a data set that is the 2100 bytes from the head of the source data.

In the ACK packet a, any data to be sent from the receiver unit to the sender unit does not exist. Therefore, the ACK number "1000" described in the packet A is used intact as the SEQ number of the ACK packet a and described as "SEQ: 1000". Similarly, the receiver unit creates an ACK packet h in response to a packet B sent from the sender unit.

It is now assumed that a packet C has suffered from a loss for some cause as shown in FIG. 11. In a packet transmission utilizing TCP, the sender unit sets a timeout time defined to be the ACK packet arrival wait time as indicated by the bold arrow Ts in the figure during packet transmission. If no ACK packet from the receiver unit arrives within the timeout time, the sender unit determines that the packet (packet C in this example) has suffered from a loss. The packet C with packet loss is retransmitted as a packet D.

In FIG. 11, the sender unit waits for an ACK packet from the receiver unit for each one packet. In practice, for more efficient transmission, a packet transmission using a window control utilizing a setting of the window size is made.

FIG. 12 illustrates an example of packet transmission operation using TCP in a case where the window size has been set in a given manner regarding IETF standard RFC793. Also, in this example, it is assumed that data items contained in packets sent out from the sender unit are all 100 bytes. For simplicity, the window size is assumed to be 400 bytes corresponding to a data size corresponding to 4 packets.

Using this window control, the sender unit can perform continuous packet transmission without waiting for ACK packets from the receiver unit until the window size is reached.

In FIG. 12, three packets are sent without waiting for ACK packets (in this example of FIG. 12, packets with SEQ:2000, SEQ:2100, and SEQ:2200 are sent without waiting for ACK packets from the receiver unit). Subsequently, packets up to four can be sent without waiting for ACK packets. A comparison of FIGS. 11 and 12 reveals that the method of FIG. 12 permits a more efficient packet transmission.

FIG. 13 schematically illustrates processing performed where a packet loss has occurred in the method of FIG. 12. As shown in FIG. 13, packets A, B, C, and D up to four, in this case, can be transmitted without waiting for ACK packets.

It is assumed that the packet B of the sent packets suffered a loss. Then, the sender unit sends a packet E in response to arrival of the ACK packet a corresponding to the packet A at the sender unit. However, because of the packet loss in the packet B, an ACK packet corresponding to the packet B is not sent back. The packets C, D, and E are received by the receiver unit normally but transmission of ACK packets corresponding to the packets C, D, and E is withheld because of the packet loss in the packet B.

In the sender unit, a timeout time (packet arrival maximum wait time) indicated by the bold arrow Ts is set from the transmission of the packet B. Where any ACK packet does not arrive within the timeout time, it is judged that a timeout and a packet loss in the packet B have occurred. The same packet as the packet B is retransmitted as packet F.

In the receiver unit that has received the packet F, data carried by the packets C, D, and E are made effective by the reception of the packet F. Therefore, an ACK packet f including the data is sent back.

In contrast with this method, a method stipulated in IETF standard RFC2582 is available. FIG. 14 illustrates one example of packet transmission operation using TCP regarding IETF standard RFC2582. This method monitors packet loss using an ACK packet from the receiver unit instead of using a timeout time as in the aforementioned method of FIG. 13.

In FIG. 14, it is also assumed that a packet loss has occurred in the packet B in the same way as in FIG. 13. It is assumed that the receiver unit has received the packet C after the ACK packet a responsive to the packet A is sent. Thus, the receiver unit detects that at least one packet has suffered from a packet loss. At this time, the receiver unit sends ACK packets a' and a" which are identical in content with the ACK packet a.

The same ACK packet was sent plural times from the receiver unit. The ACK number of the corresponding packet, i.e., ACK packet a, is 2100 (ACK:2100). Therefore, the sender unit can know that a packet loss has occurred in the packet B having a SEQ number of 2100 (SEQ:2100). Therefore, the packet B with packet loss is retransmitted as the packet F.

As can be appreciated from a comparison of FIGS. 13 and 14, the method of FIG. 14 can resume the data transmission more quickly than the method of FIG. 13.

The description provided thus far has assumed that any packet from the sender unit has a packet loss. Processing of similar contents is performed in a case where any ACK packet from the receiver unit has a packet loss.

In this way, with respect to packet transmission using TCP, arrival of each packet at the destination is checked using an ACK packet from the receiver unit. With respect to a packet for which an ACK packet is not received and thus arrival is not confirmed, retransmission is performed. This ensures the integrity of the transmission.

However, where real-time data such as voice and moving pictures is communicated on the Internet, UDP (User Datagram Protocol) that is a connection-less communication protocol stipulated in IETF standard RFC768 is often used. In this UDP, no handshake is performed between the sender and receiver. When a packet loss has occurred, retransmission of a packet is not performed.

FIG. 15 schematically illustrates the additive information contained in each packet and used in UDP regarding IETF standard RFC768. In packet transmission using UDP, data corresponding to SEQ number, ACK number, and WIN are not contained unlike the additive information in a packet in the case of TCP (see FIG. 10), because packet transmission using UDP does not perform a handshake, unlike packet transmission using TCP. In packet transmission using only UDP, neither packet loss nor reversal of the orders of arrival can be detected.

FIG. 16 illustrates one example of packet transmission operation using UDP regarding IETF standard RFC768. As can be appreciated from FIG. 16, packets from a sender unit are transmitted at regular intervals of time irrespective of presence or absence of packet loss. This is adapted for real-time transmission such as voice and moving pictures. On the other hand, as mentioned previously, retransmission is not performed when there is a packet loss. Arrival of the packet at the destination is not assured. Furthermore, the orders of arrival are not assured.

When there is a packet loss during transmission using a simple TCP, the system waits for an ACK packet within the timeout time as already described in connection with FIGS. 11 and 13. Where no ACK packet arrives after the expiration of the timeout time, retransmission is performed. Therefore, transmission is suppressed, and there is a possibility that a large delay occurs.

Furthermore, in the packet transmission using the method described in connection with FIG. 14, a delay at least corresponding to transmission of plural ACK packets takes place, though the processing is made faster than the simple transmissions shown in FIGS. 11 and 13.

However, in real-time transmission in which transmission delay of packets poses problems, such retransmission processing cannot be used. That is, in real-time data such as voice and moving pictures, even if a packet resulting in a packet loss arrives because of retransmission, data contained in the retransmitted packet will be meaningless unless packets can keep up with the playback timing.

On the other hand, in packet transmission using UDP, delay in the sender unit due to suppression of transmission involving such retransmission does not take place. However, in transmission using UDP, there is the problem that passage of packets using UDP is frequently prohibited by firewalls, for the following reason. Voice and moving pictures communicated in real time have quite large amounts of data. If they are permitted to pass, the transmission speeds of other transmissions are likely to be deteriorated.

As described so far, the prior art technique has the problem that it is difficult to guarantee the real-timeness of packet transmission using TCP. In packet transmission using UDP, there is the problem that passage of data is prohibited by a firewall or the like.

Accordingly, it is an object of the present invention to provide packet transmission system, packet transmission method, data reception system, and data reception method capable of securing real-timeness in the same way as packet transmission using UDP although packet transmission using TCP is employed.

SUMMARY (1) A packet transmission system of the present invention successively sends source data from a sender unit after dividing the data into packets and sends a receipt acknowledgment in response to each packet sent from a receiver unit that has received the receive packet to the sender unit. The receiver unit has: a data position storage unit for storing data position of each received, already received packet on the source data; a data position comparison unit for comparing the data position on the source data stored in the data position storage unit and the data position of the receive packet on the source data; and a receipt acknowledgment creation unit for creating the receipt acknowledgment in a case where the data position comparison unit has determined that the data position of the receive packet on the source data is behind the data position on the source data stored in the data position storage unit.

In this way, in the present invention, an ACK packet is created only according to the result of a comparison between the data position of each receive packet sent from a sender unit and the data position of each already received packet. Therefore, the sender unit can transmit data at regular intervals of time irrespective of whether there is a packet loss. This permits packet transmission adapted for real-time data transmission such as voice and moving pictures. Furthermore, the invention is only required to take measures using only the receiver unit. Hence, it is not necessary to modify the design of the sender unit.

This makes it possible, using TCP, to secure real-timeness comparable to UDP. Furthermore, a data format equivalent to TCP is used as the data format of packets and so the packets can pass through firewalls more easily. In addition, the sender unit is equivalent to TCP and, therefore, there is the advantage that the receiver unit can reject malicious real-time transmissions, for example, from the outside, for the following reason. In the case of TCP, it is impossible to transmit data of size exceeding the window size that can be sent continuously without waiting for a receipt acknowledgment unless the receiver unit sends back an ACK packet.

(2) Another packet transmission system is based on the packet transmission system as set forth in (1) above and further includes a data position updating unit for updating the data position on the source data stored in the data position storage unit. The data position updating unit updates the data position on the source data stored in the data position storage unit to a data position that is obtained by adding the data length of the data contained in the receive packet to the data position of the receive packet on the source data in a case where the data position comparison unit has determined that the data position of the receive packet on the source data is behind the data position on the source data stored in the data position storage unit.

Thus, the present data position of the already received packet on the source data can be represented appropriately. Consequently, the data position of the packet (receive packet) sent from the sender unit and the data position of the already received packet that has undergone the reception processing can be compared appropriately. A decision as to which one of the two data positions is located ahead of the other can be made appropriately.

(3) A further packet transmission system is based on the packet transmission system as set forth in (1) or (2) above and further characterized in that the decision that the data position of the receive packet on the source data is behind the data position on the source data stored in the data position storage unit is made based on a sequence number contained in the receive packet and a sequence number contained in the already received packet, and that in a case where the sequence number contained in the receive packet has a value greater than that of the sequence number contained in the already received packet, it is preferably determined that the data position of the receive packet on the source data is behind the data position on the source data stored in the data position storage unit.

This means that it is determined which one of the data position of the receive packet on the source data and the data position of the already received packet on the source data is located ahead of the other, according to the magnitude of the sequence numbers contained in the receive packet and already received packets, respectively. In the case (2) above, if the sequence number contained in the receive packet is greater than the sequence number contained in the already received packet, it is determined that the data position of the receive packet on the source data is behind the data position on the source data stored in the data position storage unit. Consequently, the positional relation between the data positions of the receive packet and already received packets on the source data can be determined appropriately.

(4) Still another packet transmission system is based on the packet transmission system as set forth in (2) or (3) and further characterized in that the receipt acknowledgment created by the receipt acknowledgment creation unit provides a description of a data position that is obtained by adding the data length of data contained in the receive packet to the data position of the receive packet on the source data as a result of the update done by the data position updating unit.

As a consequence, it is possible to adequately inform the sender unit of the data position on the already received packet on the source data.

(5) Yet another packet transmission system is based on the packet transmission system set forth in any one of (1)-(4) above and further characterized in that the receive packet is preferably discarded in a case where the data position of the receive packet on the source data is found to be ahead of the data position on the source data stored in the data position storage unit as a result of the comparison made between the data position of the receive packet on the source data and the data position on the source data stored in the data position storage unit by the data position comparison unit.

This means that where the orders of the data positions of packets sent have been reversed, the packets are discarded. Consequently, where real-time data transmission is performed such as voice or moving pictures, the receiver unit can be prevented from performing processing of the meaningless packets.

The decision as to whether the data position of the receive packet on the source data is located ahead of the data position on the source data stored in the data position storage unit is made according to the magnitude of the sequence numbers contained in the receive packet and already received packet, respectively, as described in (3) above. In the case (5) above, if the sequence number contained in the receive packet has a value smaller than that of the sequence number contained in the already received packet, it is determined that the data position of the receive packet on the source data is ahead of the data position on the source data stored in the data position storage unit.

(6) Furthermore, the invention provides a packet transmission method for successively sending source data from a sender unit after dividing the data into packets and for sending a receipt acknowledgment in response to each packet sent from a receiver unit that has received the receive packet to the sender unit. The receiver unit performs the steps of: storing data position of each received, already received packet on the source data; comparing the data position on the source data stored by the step of storing the data position and data position of the receive packet on the source data; and creating the receipt acknowledgment in a case where it has been determined as a result of the step of comparing the data positions that the data position of the receive packet on the source data is behind the data position on the source data stored by the step of storing the data position.

The packet transmission method set forth in (6) can yield the same advantages as the system set forth in (1) above.

Also, in the packet transmission method set forth in (6), where it is determined that the data position of the receive packet on the source data is behind the data position on the source data stored by the step of storing the data position, the data position on the source data stored by the step of storing the data position is preferably updated to a data position obtained by adding the data length of data contained in the receive packet to the data position of the receive packet on the source data.

Also, in the packet transmission method set forth in (6), the decision that the data position of the receive packet on the source data is behind the data position on the source data stored by the step of storing the data position is made based on the sequence numbers contained in the receive packet and already received packet, respectively. Where the sequence number contained in the receive packet has a value greater than that of the sequence number contained in the already received packet, the data position of the receive packet on the source data is preferably judged to be behind the data position on the source data stored by the step of storing the data position.

Also, in the packet transmission method set forth in (6), with respect to the receipt acknowledgment, the data position is preferably described as a data position obtained by adding the data length of data contained in the receive packet to the data position of the receive packet on the source data as a result of the update of the data position.

Also, in the packet transmission method set forth in (6), in a case where the result of the comparison between the data position of the receive packet on the source data and the data position on the source data stored by the step of storing the data position indicates that the data position of the receive packet on the source data is ahead of the data position on the source data stored by the step of storing the data position, it is desired to discard the receive packet.

(7) A data reception system of the present invention receives each packet sent from a sender unit side as a receive packet and sends a receipt acknowledgment to the sender unit side in response to the receive packet. The data reception system has: a data position storage unit for storing data position of each received, already received packet on the source data; data position comparison unit for comparing the data position on the source data stored in the data position storage unit and the data position of the receive packet on the source data; and a receipt acknowledgment creation unit for creating the receipt acknowledgment in a case where the data position comparison unit has determined that the data position of the receive packet on the source data is behind the data position on the source data stored in the data position storage unit.

Using the data reception system set forth in (7), the packet transmission system set forth in (1) can be, configured, and the same advantages as the packet transmission system of (1) can be obtained. The data reception system set forth in (7) preferably has the same features as those of the packet transmission systems set forth in (2)-(5) above.

(8) A data reception method of the present invention is used to receive each packet sent from a sender unit side as a receive packet and to send a receipt acknowledgment to the sender unit side in response to the receive packet. The data reception method comprises the steps of: storing data position of each received, already received packet on the source data; comparing the data position on the source data stored by the step of storing the data position and the data position of the receive packet on the source data; and creating the receipt acknowledgment in a case where it has been determined by the step of comparing the data positions that the data position of the receive packet on the source data is behind the data position on the source data stored by the step of storing the data position.

Using the data reception method set forth in (8), the packet transmission method set forth in (6) can be configured. The data reception method set forth in (8) also preferably has features similar to those of the packet transmission systems set forth in (2)-(5) above.

(9) A packet transmission system of the present invention successively sends source data from a sender unit after dividing the data into packets and sends a receipt acknowledgment in response to each packet sent from a receiver unit that has received the receive packet to the sender unit. The receiver unit has: a data position storage unit for storing data position of each received, already received packet on the source data; a timeout condition setting unit for setting timeout conditions including a packet arrival maximum wait time; a timeout condition decision unit for making a decision based on the timeout conditions as to whether there is a timeout; and a receipt acknowledgment creation unit for creating a pseudo receipt acknowledgment based on the data position on the source data stored in the data position storage unit in a case where the timeout condition decision unit has determined that there is a timeout.

This means that the timeout processing is assigned to the receiver unit. Consequently, if packets are lost in bursts, the sender unit can continuously send in the same way as packet transmission using UDP.

(10) An additional packet transmission system is based on the packet transmission system set forth in (9) above and further includes a data position updating unit for updating the data position on the source data stored in the data position storage unit. The data position updating unit updates the data position on the source data stored in the data position storage unit to a data position that is obtained by adding a timeout data length corresponding to the packet arrival maximum wait time to the data position on the source data stored in the data position storage unit in a case where the timeout condition decision unit has determined that there is a timeout.

Thus, the already received data position at the present instant can be expressed adequately. This makes it possible to appropriately compare the data position of each packet sent from the sender unit and the data position of the already received packet undergone the reception processing. The positional relation between both data positions can be judged appropriately.

(11) Still another packet transmission system is based on the packet transmission system set forth in (10) above and further characterized in that the receipt acknowledgment created by the receipt acknowledgment creation unit provides a description of a data position that is obtained by adding the timeout data length to the data position on the source data stored in the data position storage unit as a result of the update done by the data position updating unit.

Consequently, the sender unit can be appropriately informed of the data position of the already received packet on the source data.

(12) Another packet transmission system according to the. present invention is based on any one of the packet transmission systems set forth in (9)-(11) above and further characterized in that the packet arrival maximum wait time is preferably set to or close to ((WIN/ABR)−RTT) seconds in a case where the average transmission speed is ABR bytes/second, average reciprocation delay time of the transmission between the sender and receiver units is RTT seconds, and a window size that is a data size capable of being sent continuously without waiting for a receipt acknowledgment is WIN bytes.

This is based on the following principle. In order that data arrive from a sender unit to a receiver unit and that a corresponding ACK reply be received by the sender unit, a time of at least RTT seconds is required. Hence, the maximum value of the timeout time for continuing the transmission is approximately ((WIN/ABR)−RTT) seconds. Therefore, if the timeout time is set smaller than this value, continuous transmission is enabled.

Note that one can cope with the worst case where packets corresponding to the window size are all lost. Taking account of this, the maximum value of the timeout time is preferably set to or close to ((WIN/ABR)−RTT) seconds.

(13) A packet transmission system is based on (10) or (12) above and further characterized in that the timeout data length is set to the timeout time×ABR.

This shows that the timeout data length can be set by the timeout time, which is set as in (12) above.

(14) A packet transmission system is based on any one of (9)-(13) above and further characterized in that where the decision made by the timeout condition decision unit is that there is no timeout, the data position of each receive packet on the source data and data position on the source data stored in the data position storage unit are compared regarding each receive packet for which no timeout is found. Where the data position of the receive packet on the source data is judged to be behind the data position on the source data stored in the data position storage unit, a receipt acknowledgment is preferably created.

This is the case where a packet is received from the sender unit before the timeout time is reached. In this case, the same processing as the invention of the packet transmission system set forth in (1) above can be performed. The packet transmission system set forth in (14) has the same advantages as the system set forth in (1). In addition, the system has the advantage that if packet losses are produced in bursts, the sender unit can continuously send in the same way as packet transmission using UDP.

(15) A packet transmission method of the present invention is used to successively send source data from, a sender unit after dividing the data into packets and to send a receipt acknowledgment in response to each receive packet from a receiver unit that has received the receive packet to the sender unit. The receiver unit performs the steps of: storing data position of each received, already received packet on the source data; setting timeout conditions including a packet arrival maximum wait time; making a decision based on the timeout conditions as to whether there is a timeout; and creating a pseudo receipt acknowledgment based on the data position on the source data stored in the data position storage unit in a case where the decision made by the step of making a decision is that there is a timeout.

The packet transmission method set forth in (15) produces the same advantages as the packet transmission system set forth in (9) above.

Also, in this packet transmission method set forth in (15), in a case where the result of the decision is that there is a timeout, the data position on the source data stored by the step of storing the data position is preferably updated to a data position obtained by adding the timeout data length corresponding to the packet arrival maximum wait time to the data position on the source data stored by the step of storing the data position.

Also, in this packet transmission method set forth in (15), with respect to the receipt acknowledgment, a data position obtained by adding the timeout data length to the data position on the source data stored by the step of storing the data position is preferably described as the data position as a result of the update of the data position.

Also, in this packet transmission method set forth in (15), the timeout time is preferably set to or close to ((WIN/ABR)− RTT) seconds when the average transmission speed is ABR bytes per second, the average reciprocation delay time of the transmission between the sender and receiver units is RTT seconds, and a window size that is a data size capable of being sent continuously without waiting for a receipt acknowledgment is WIN bytes.

Also, in this packet transmission method set forth in (15), the timeout data length is preferably set to the timeout time× ABR.

Also, in this packet transmission method set forth in (15), if the result of the step of making a decision on a timeout is that there is no timeout, the data position of each receive packet on the source and the data position on the source data stored by the step of storing the data position are compared regarding each receive packet for which no timeout is found. If the data position of the receive packet on the source data is judged to be behind the data position on the source data stored by the step of storing the data position, a receipt acknowledgment is preferably created.

(16) A data reception system of the present invention receives each packet sent from a sender unit side as a receive packet and sends a receipt acknowledgment to the sender unit side in response to the receive packet. The data reception system has: a data position storage unit for storing data position of each received, already received packet on the source data; a timeout condition setting unit for setting timeout conditions including a packet arrival maximum wait time; a timeout condition decision unit for making a decision based on the timeout conditions as to whether there is a timeout; and a receipt acknowledgment creation unit for creating a pseudo receipt acknowledgment based on the data position on the source data stored in the data position storage unit in a case where the timeout condition decision unit has determined that there is a timeout.

Using the data reception system set forth in (16), the packet transmission system set forth in (9) can be configured. The same advantages as those of the packet transmission system of (9) can be obtained. Preferably, the data reception system set forth in (16) has features similar to those of the packet transmission systems set forth in (10)-(14) above.

(17) A data reception method of the present invention is used to receive each packet sent from a sender unit side as a receive packet and to send a receipt acknowledgment to the sender unit side in response to the receive packet. The method comprises the steps of: storing data position of each received, already received packet on the source data; setting timeout conditions including a packet arrival maximum wait time; making a decision based on the timeout conditions as to whether there is a timeout; and creating a pseudo receipt acknowledgment based on the data position on the source data stored in the data position storage unit in a case where the decision made by the step of making a decision is that there is a timeout.

Using the data reception method set forth in (17), the packet transmission method set forth in (15) can be achieved. Preferably, the data reception method set forth in (17) has features similar to those of the packet transmission systems set forth in (10)-(14) above.

BRIEF DESCRIPTION OF THE DRAWINGS

FIG. 10 is a schematic diagram of additive information included in a packet using TCP;

FIG. 11 is a flowchart illustrating one example of simplified packet transmission operation using TCP regarding IETF standard RFC793;

DETAILED DESCRIPTION

Embodiments of the present invention are hereinafter described. The contents of the descriptions of the embodiments include the descriptions of a packet transmission system, packet transmission method, data reception system, and data reception method of the present invention.

Embodiment 1

Embodiment 1 of the present invention is described in detail with reference to FIGS. 1 to 4. In Embodiment 1 and Embodiment 2 (described later), it is assumed that source data (voice, moving pictures, and other data having real-timeness) are packetized from the head and sent.

In the present invention, the data position on the source data of each sent packet (that is a received packet as viewed from the receiver side) indicates the order of transmission on the time axis. That is, as the data position is in a more forward position, the order of transmission is located in a more forward position on the time axis. This also indicates the anticipated arrival time on the receiver side. As the data position is in a more forward position, the arrival time should be in a more forward position on the time axis.

The data position on the source data can be judged based on the magnitude of the sequence number contained in each sent packet that is a packet received by the receiver side. For example, as packets received by the receiver side have greater sequence numbers, the data positions of the packets on the source data are located in more rear positions.

Figure 1:
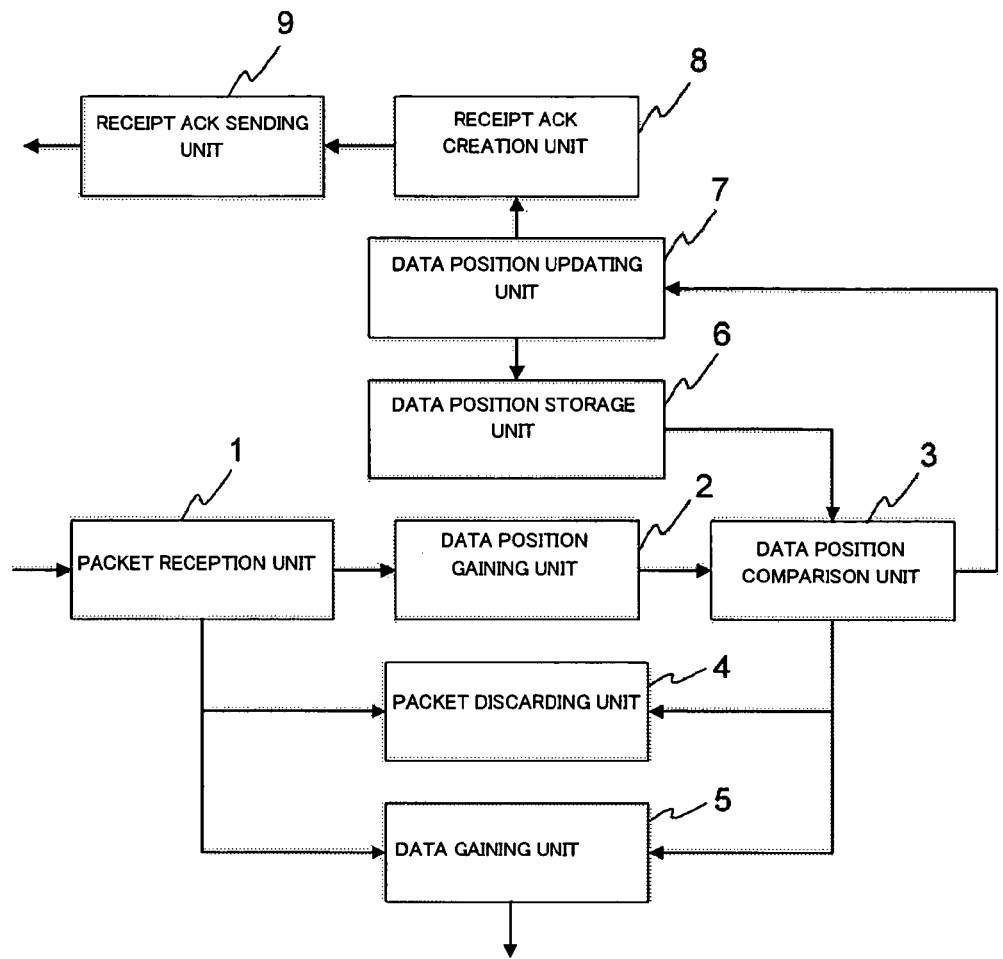
FIG. 1 is a schematic diagram of a receiver unit, illustrating Embodiment 1 of the present invention.

FIG. 1 shows the structure of a packet transmission system in Embodiment 1 of the present invention. The present invention is characterized by processing on the receiver side (referred to as the receiver unit). The sender side (referred to as the sender unit) is not required to be made different from the prior art sender unit that performs packet transmission using TCP. Therefore, only the structure of the receiver unit is shown in FIG. 1.

The receiver unit of the packet transmission system shown in FIG. 1 is designed to have a packet reception unit 1 for receiving packets sent in, a data position gaining unit 2 for gaining the data positions of the packets (referred to as the receive packets) received by the packet reception unit 1, a data position comparison unit 3 for comparing each data position gained by the data position gaining unit 2 and the data position of the received, already received packet on the source data, a packet discarding unit 4 for discarding the receive packets under some conditions (described later), a data gaining unit 5 for gaining data contained in the receive packets (data about voice and moving pictures to be reproduced), a data position storage unit 6 for storing the data positions of the aforementioned received, already received packets on the source data, a data position updating unit 7 for updating the storage contents of the data position storage unit 6 based on the results of the comparison made by the data position comparison unit 3, a receipt acknowledgment creation unit 8 for creating an ACK packet as a receipt acknowledgment based on the results of the update done by the data position updating unit 7, and a receipt acknowledgment sending unit 9 for sending the ACK packet created by the receipt acknowledgment creation unit 8 to a sender unit.

The operations and functions of these components will be described successively in detail according to the need in the following description.

Figure 2:
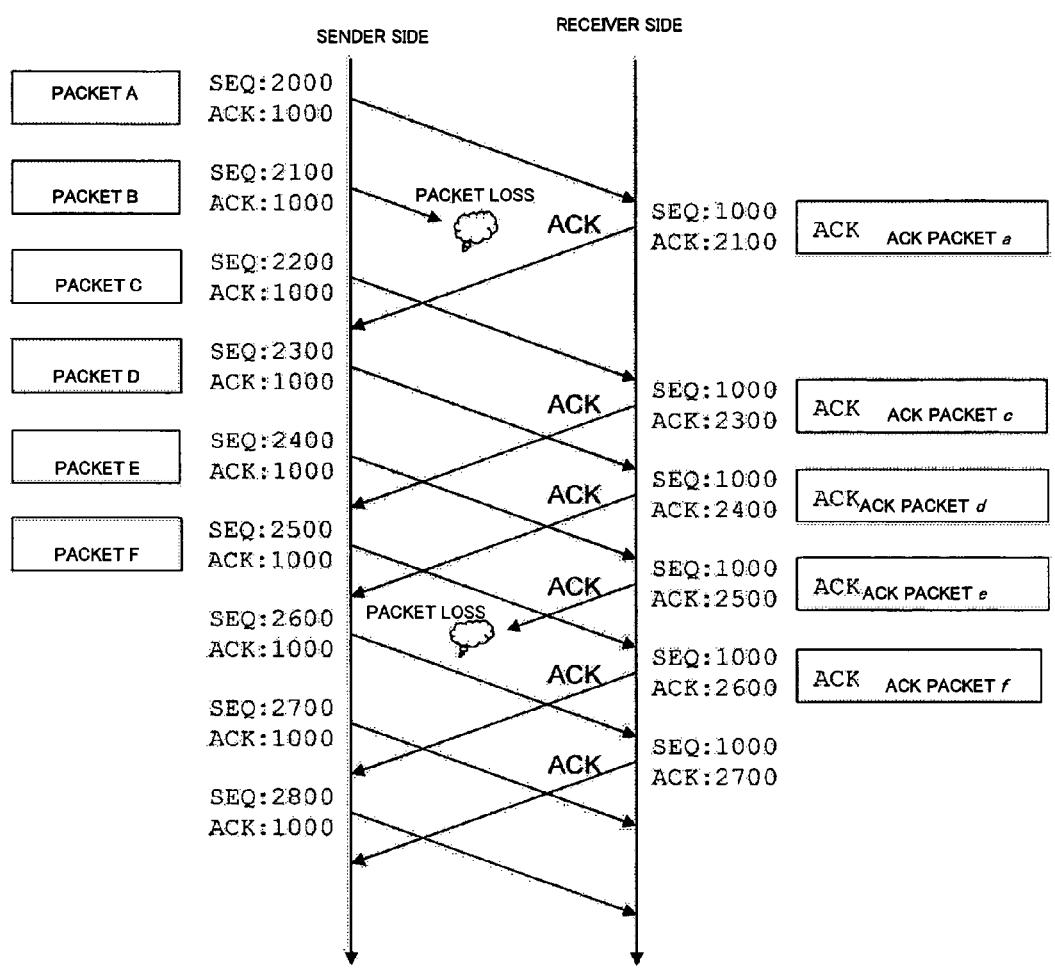
FIG. 2 is a diagram illustrating packet transmission operations of Embodiment 1 of the invention.
Figure 13:
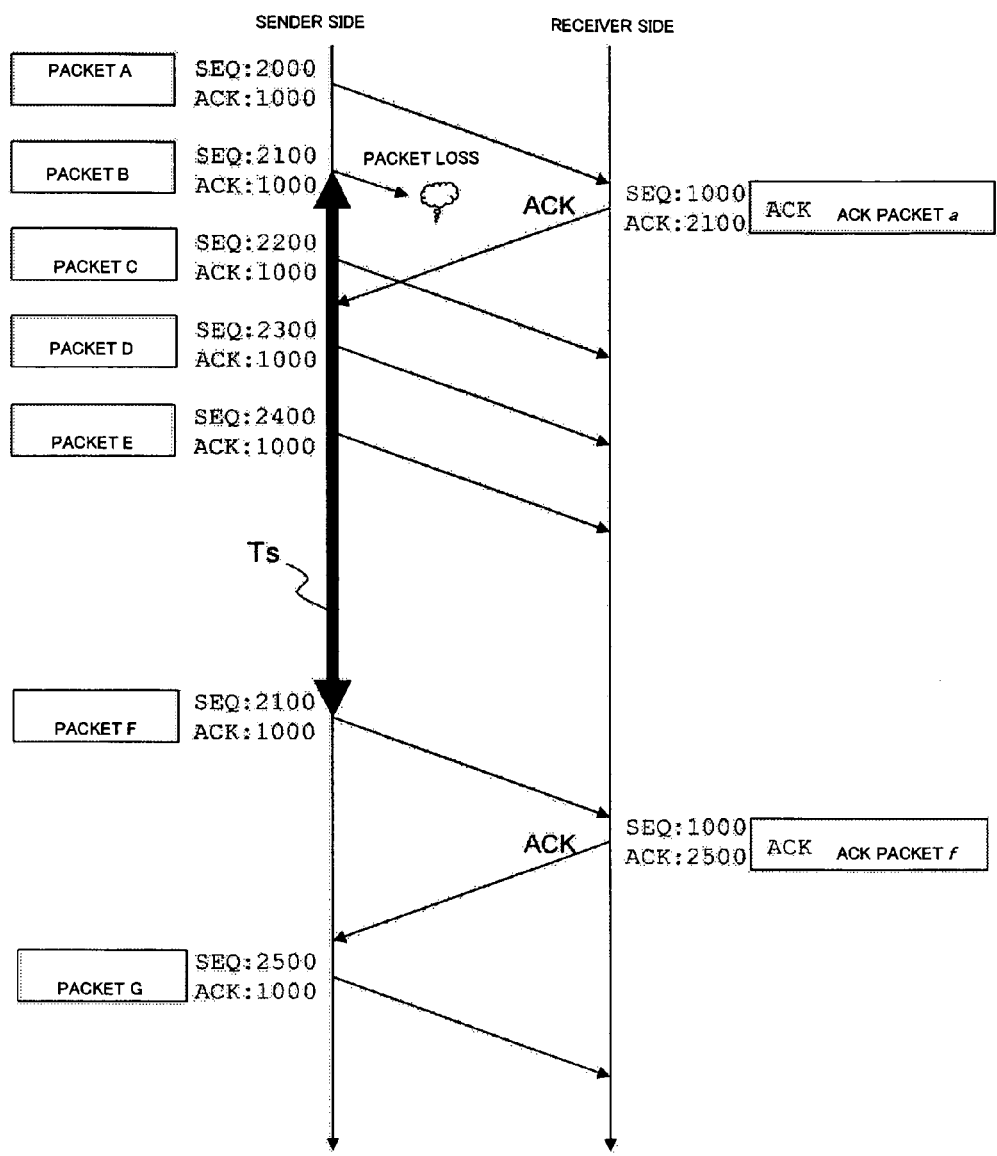
FIG. 13 is a diagram illustrating a packet transmission operation in a case where a packet loss is produced in the operation illustrated in FIG. 12.
Figures 14, 15:
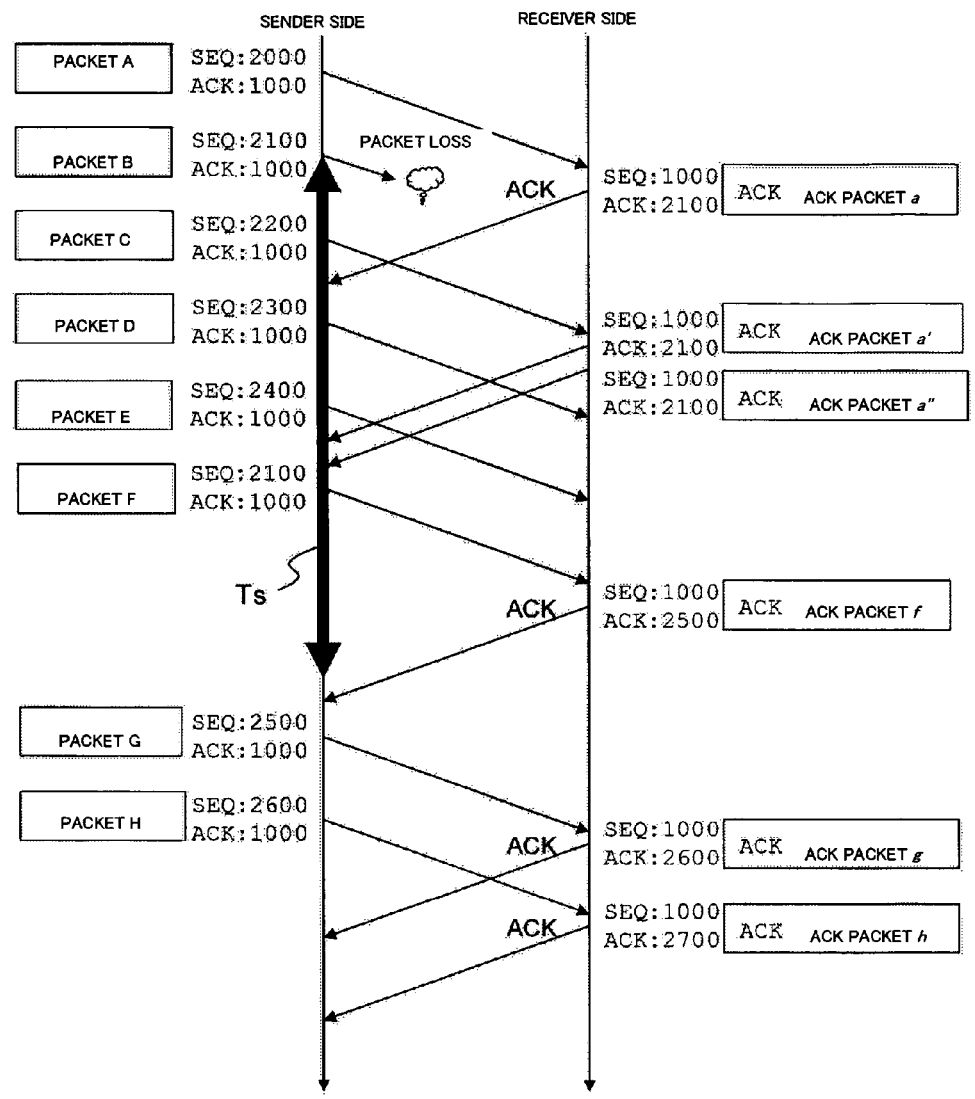
FIG. 14 is a diagram illustrating one example of packet transmission operation using TCP regarding IETF standard RFC2582.
FIG. 15 is a schematic diagram of additive information included in a packet used in UDP regarding IETF standard RFC768.

FIG. 2 is a diagram illustrating a packet transmission operation of Embodiment 1 of the present invention and corresponds to FIG. 13 illustrating a prior art example. Also, in this example of operation of FIG. 2, it is assumed that data contained in each individual packet is 100 bytes. Furthermore, it is assumed for simplicity that the window size is 400 bytes, which corresponds to the total amount of data contained in four packets. FIG. 2 also shows an example in which packet B has suffered from a packet loss, in the same way as in FIG. 13.

The operation of Embodiment 1 is described in detail with reference to FIG. 3 that is a flowchart illustrating the flow of processing of Embodiment 1, as well as to the above-quoted FIGS. 1 and 2.

Figure 3:
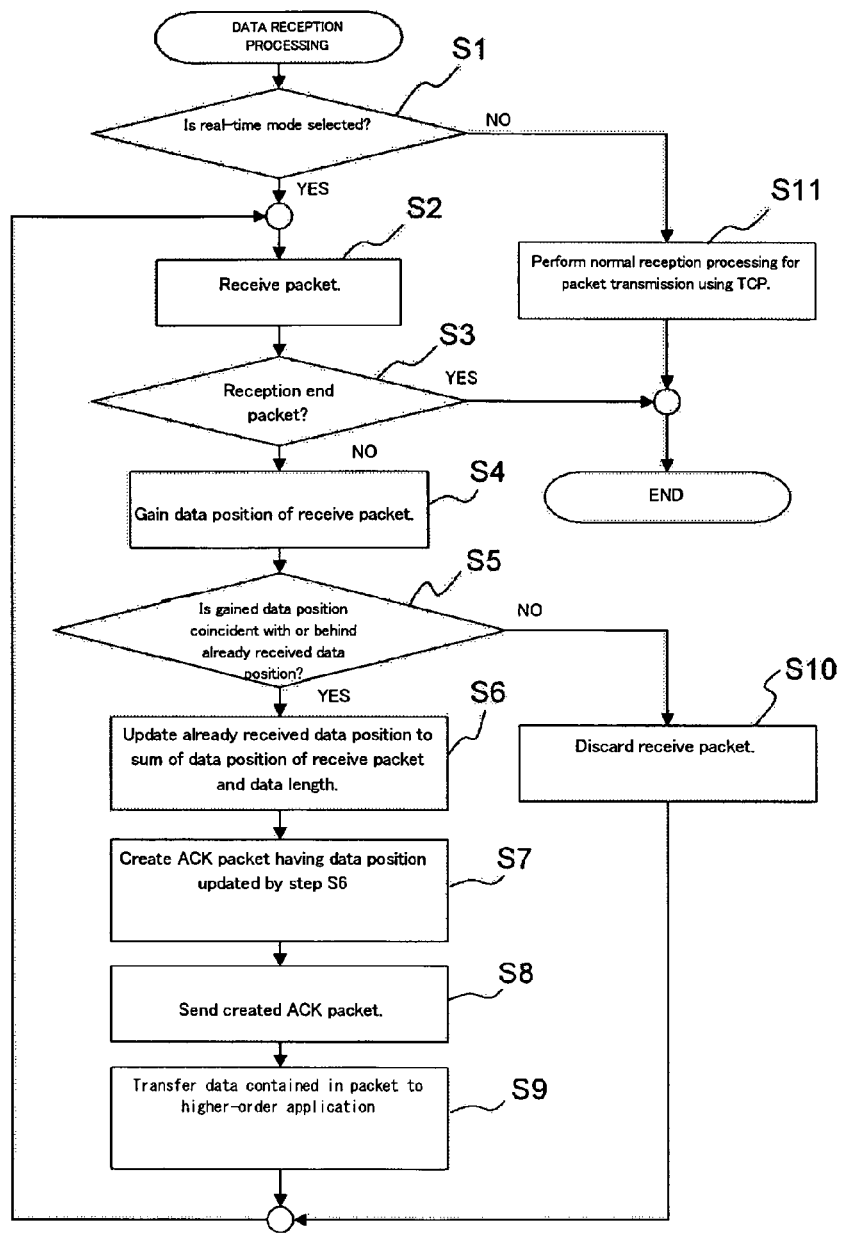
FIG. 3 is a flowchart illustrating a processing procedure of Embodiment 1 of the invention.

FIG. 3 is a flowchart illustrating a processing procedure of Embodiment 1 of the invention. In FIG. 3, it is assumed that a real-time mode is selected herein as a transmission mode (step S1). Where the real-time mode is not selected, normal reception processing for packet transmission using TCP should be performed (step S11). Therefore, it is not necessary to perform the processing of Embodiment 1 shown by step S2 and subsequent steps.

In the real-time mode, it is first assumed that a packet (packet A in FIG. 2) sent from a sender unit is received by the packet reception unit 1 (step S2). A decision is made as to whether the receive packet indicates the end of data reception processing (step S3). If the packet indicates the end, the processing is ended. If the decision is negative, the data position gaining unit 2 gains the data position of the receive packet (hereinafter referred to as the data position of the receive packet) on the source data (step S4).

This is processing for reading an SEQ number from within the additive information in each packet shown in FIG. 10, for example. In the example of FIG. 2, "2000" is read out as the SEQ number from the packet A.

The gained data position (SEQ number) of the receive packet and the SEQ number of the data position (hereinafter referred to as the "already received data position") of each already received packet on the source data stored in the data position storage unit 6 are compared by the data position comparison unit 3 (step S5). It is assumed herein that the SEQ number of the already received data position stored in the data position storage unit 6 is less than 2000.

In this way, a decision made in step S5 indicates that the data position of the receive packet is coincident with or behind the already received data position stored in the data position storage unit 6. Therefore, the already received data position is updated, an ACK packet is created, and it is sent out (steps S6 to S8).

Specifically, the data position updating unit 7 updates the already received data position stored in the data position storage unit 6 to "data position of the receive packet+data length". In this embodiment, the data position is updated to the sum (in this embodiment, 2100) of the data position of the receive packet A (in this embodiment, 2000) and the data length of the receive packet A (in this embodiment, 100) (step S6). A corresponding ACK packet a is created (step S7). The created ACK packet (in this embodiment, ACK packet a) is sent to the sender unit (step S8).

The ACK packet a becomes an ACK packet having a data position equal to the sum of the data position "2000" of the receive packet A that is the result of update in step S6 and the data length "100" of the receive packet, i.e., 2000+100=2100.

Data contained in the receive packet A (e.g., data about voice or moving pictures) is routed to a higher-order application (step S9).

Then, processing returns to step S1. As shown in FIG. 2, packet B is sent from the sender unit. Since the packet B has a loss, the receiver unit cannot receive the packet B. A corresponding ACK packet is not created.

Subsequently, the packet C is sent. If this packet C is received by the receiver unit (step S2), processing similar to the processing for the packet A is performed. That is, the data position of the receive packet C is 2200. Since this data position "2200" is located behind the data position "2100", at this instant, of the already received data position stored in the data position storage unit 6, the data position of the already received packet stored in the data position storage unit 6 is updated to 2300 (2200+100). Also, an ACK packet c based on the result of the update is transmitted.

In FIG. 13 showing a prior art example, if the packet C transmitted subsequently to the packet B with a loss is received normally, a corresponding ACK packet is not created, because a decision is made based on the history of the packet loss, i.e., non-arrival of the packet B.

In contrast, in Embodiment 1, the data position of the receive packet and the data position of the already received packet are compared irrespective of the history of past packet losses as mentioned previously. An ACK packet is created when the condition that the data position of the receive packet is behind the already received data position is satisfied. Therefore, as shown in FIG. 2, if the packet B cannot be received, ACK packets c and d corresponding to packet C and D are created. This permits the sender unit to transmit packets at regular intervals regardless of presence or absence of packet loss, like a packet transmission using UDP as shown in FIG. 11.

Referring also to FIG. 2, it is assumed that an ACK packet e corresponding to a packet E has suffered from a loss. Also, in this case, an ACK packet f corresponding to the packet F is sent. Therefore, a loss in the ACK packet e does not affect the transmission.

In this way, in Embodiment 1, handshaking impeding the real-timeness in normal packet transmission using TCP is prevented. Also, delay due to retransmission is prevented. Furthermore, it is a packet transmission using a packet data format equivalent to TCP. Therefore, the packets can pass through a firewall; in transmission using UDP, the passage is prohibited.

On the other hand, in a normal packet transmission using TCP, it is assured that packets arrive at the destination. In the present invention, it is not assured. However, in an application requiring a real-time transmission using a packet transmission using UDP, a method of reducing the effects of packet loss is previously prepared. Non-guarantee itself of arrival of packets at the destination will not present great problems. Therefore, the receiver unit can use prior applications intact except that the data receiver portion of the receiver unit is replaced such that the present invention can be applied.

Furthermore, the sender unit can use prior applications without modifications because it is not necessary to distinguish whether the receiver unit is performing a normal packet transmission using TCP or a transmission according to the present invention.

Of course, the processing of the present invention can coexist with the prior art. As shown as the first processing step (processing of step S1) of the flowchart of FIG. 3, the processing of the present invention can be performed only when the real-time mode is selected. In other cases, prior art packet transmissions using TCP (step S11) can be performed.

Figure 4:
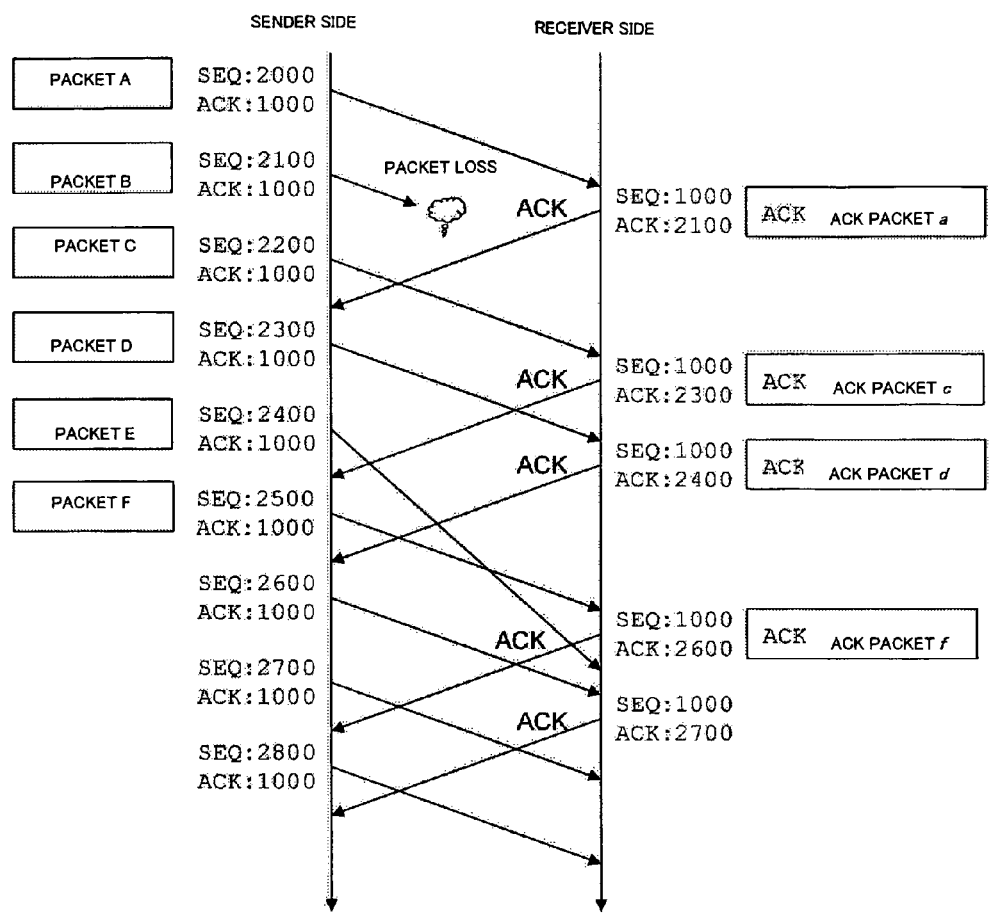
FIG. 4 is a diagram illustrating the operation in a case where the orders of arrival of packets are reversed in Embodiment 1 of the invention.

FIG. 4 is a diagram illustrating operations performed when the orders of arrival of packets are reversed in Embodiment 1 of the invention. In the prior packet transmission using TCP, arriving data is not discarded except where the same data is received in duplicate.

As shown in FIG. 4, it is assumed that the packet E arrives at the receiver unit with a very great delay for some cause. This can take place also in the prior art packet transmission using TCP in a case where the window size is increased to a very large value.

In this way, where some packet arrives at the receiver unit with a very great delay for some cause, the delayed packet is discarded if the decision in step S5 of the flowchart of FIG. 3 is that the condition that the data position of the receive packet is coincident with or behind the already received data position stored in the data position storage unit 6 is not satisfied.

That is, in this case, the data position of the packet E in FIG. 4 is 2400 according to the SEQ number. On the other hand, the already received data position, at that instant, stored in the data position storage unit 6 has been updated to 2600 that is a data position described by the ACK packet f.

Accordingly, it is determined that the data position of the packet E is ahead of the already received data position at that time, the latter data position being stored in the data position storage unit 6. Where the orders of arrival of packets are reversed when some packet arrives at the receiver unit with a very great delay for some cause, the packet E is discarded (step S10). For this reason, an ACK packet corresponding to the packet E is not created. The large delay in the packet E does not affect the transmission.

As described so far, in Embodiment 1, normal packet transmission processing using TCP having a given window size is performed. In addition, packet transmission processing for real-time transmission is performed. That is, where an instruction for making a real-time transmission from now on is given, the processing of the receiver unit for packet transmission after the issuance of the instruction can be switched to packet reception processing for real-time transmission.

This packet reception processing for real-time transmission is the processing starting with step S2 of the flowchart of FIG. 2. The packet reception processing for real-time transmission is now summarily described. Where the data position of the receive packet is behind the already received data position stored in the data position storage unit 6, a corresponding ACK reply is sent back. Also, the already received data position stored in the data position storage unit 6 is updated to the newest data position.

Furthermore, if a packet loss is detected, the detection is neglected and an ACK reply is sent back until the set window size is reached in a case where the data position of the receive packet is behind the already received data position stored in the data position storage unit 6. On the other hand, where the data position of the receive packet is ahead of the already received data position stored in the data position storage unit 6, the receive packet is discarded. At this time, the already received data position stored in the data position storage unit 6 is not updated.

In this way, the receiver unit does not control packet loss at all. Rather, the unit notices each individual received packet, creates an ACK packet, and sends it to the sender unit.

This processing is much simpler than the prior art reception processing. This can suppress retransmission responsive to a few packet losses. Further, if ACK packets result in packet losses, successively sent ACK replies suppress retransmission.

Consequently, the real-timeness equivalent to UDP can be secured. Furthermore, a format equivalent to TCP is used as the packet data format. Therefore, packets pass through the firewall more easily. In addition, only the receiver unit is remodeled according to the invention and so the sender unit is not required to be modified. Furthermore, the sender unit is equivalent to TCP. Therefore, there is the advantage that if there is a malicious transmission from the outside, for example, the receiver unit can reject real-time transmission. That is, in the case of UDP, the sender unit can continue to send data irrespective of the status of the receiver unit. On the other hand, in the case of TCP, transmission exceeding the window size cannot be performed unless the receiver unit sends back an ACK packet.

Embodiment 2

Embodiment 2 of the present invention is described in detail with reference to FIGS. 5 to 9. Embodiment 2 is principally intended to cope with circumstances as shown in FIG. 5.

Figure 5:
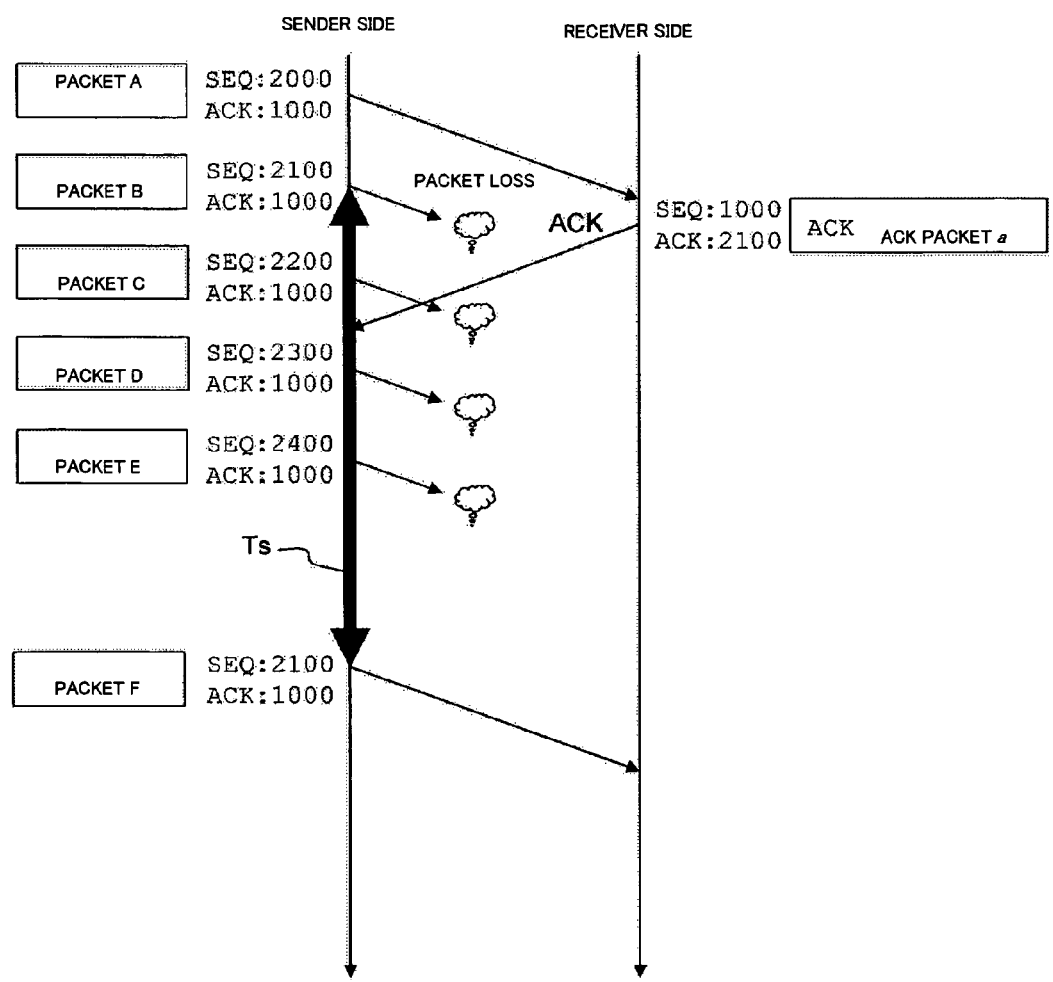
FIG. 5 is a diagram illustrating packet transmission operations using TCP in a case where consecutive packet losses are produced.

FIG. 5 is a diagram illustrating packet transmission operations using TCP in a case where packet losses are produced consecutively. In FIG. 5, it is assumed that after packet A is received by a receiver unit and a corresponding ACK packet a is sent, packets sent from the sender unit result in consecutive packet losses.

At this time, the sender unit can send packets until the window size (assumed to correspond to four packets in this embodiment) is reached. At the instant when the window size is reached, the transmission is stopped. Furthermore, all packets sent later than the packet A do not arrive at the receiver unit and so no ACK packet is created after ACK packet a responsive to the packet A is sent.

Therefore, in the embodiment shown in FIG. 5, the sender unit does not resume the transmission until the timeout time that is the packet arrival wait maximum time indicated by the bold arrow Ts in FIG. 5 elapses. In this case, when the timeout time elapses, retransmission of packet B and subsequent packets is started. Packet F is a retransmitted packet responsive to the packet B.

Where consecutive packet losses (such as a packet loss burst) as shown in FIG. 5 occur, the sender unit cannot send consecutively. Such a circumstance might occur also in the aforementioned Embodiment 1. That is, Embodiment 1 is intended to cope with normal packet losses. Embodiment 1 can sufficiently cope with normal packet losses. However, it may not sufficiently cope with burst packet losses as shown in FIG. 5. Embodiment 2 is intended to solve this problem.

Figure 6:
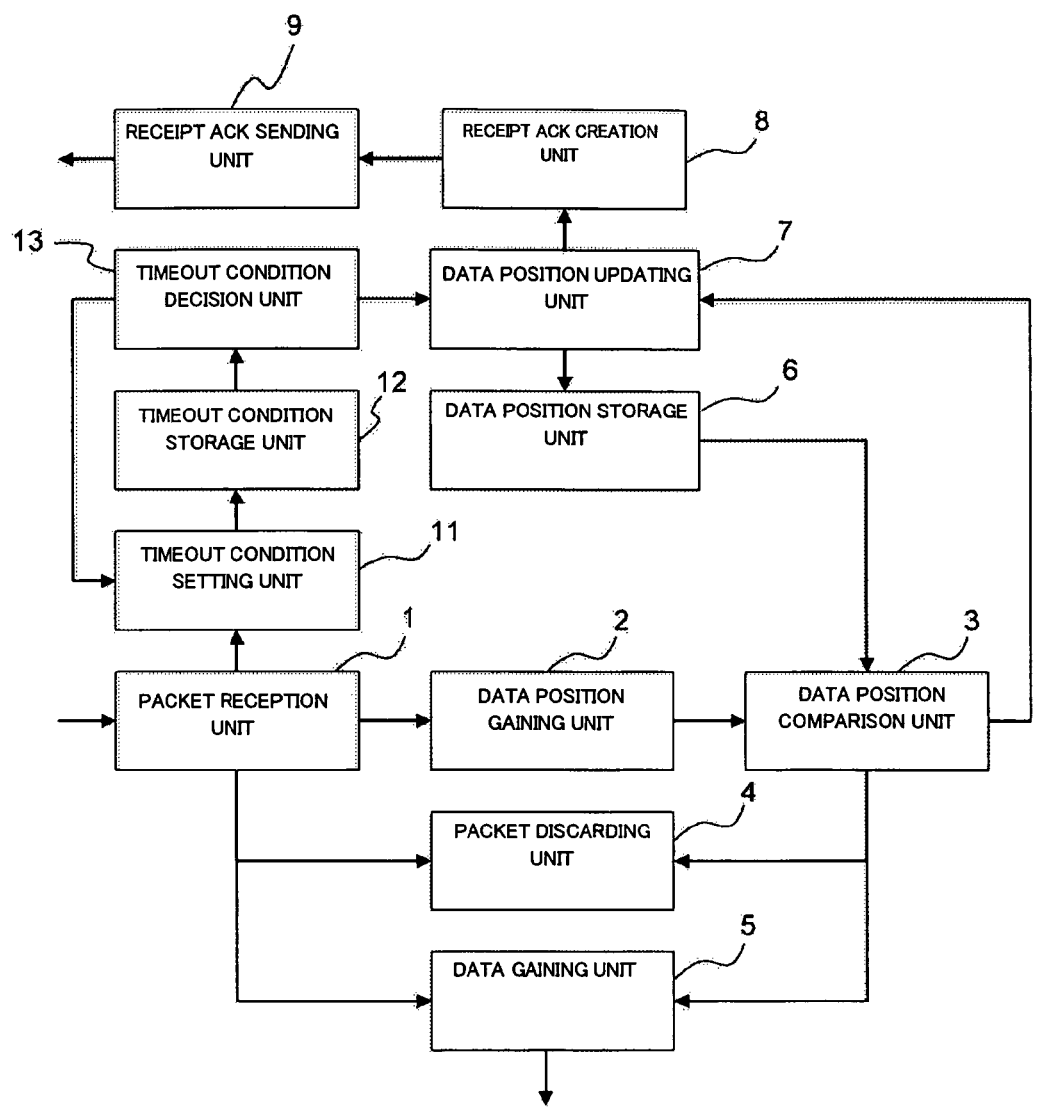
FIG. 6 is a schematic diagram of a receiver unit, illustrating Embodiment 2 of the invention.

FIG. 6 is a block diagram of a receiver unit illustrating Embodiment 2 of the present invention. In Embodiment 2, the receiver unit is equipped with a timeout condition setting unit 11, a timeout condition storage unit 12, and a timeout condition decision unit 13 as shown in the block diagram of FIG. 6. The structure shown in FIG. 6 is similar with the structure shown in FIG. 1 in other respects. Identical components are indicated by identical symbols in both figures. The operations and functions of the timeout condition setting unit 11, timeout condition storage unit 12, and timeout condition decision unit 13 will be described in connection with the operation of Embodiment 2 given below.

Embodiment 2 of the present invention is hereinafter described in detail with reference to FIGS. 6 to 9. Also, in Embodiment 2, it is assumed that data contained in each individual packet is 100 bytes. In addition, the window size is assumed to be 400 bytes corresponding to data in 4 packets.

Figure 7:
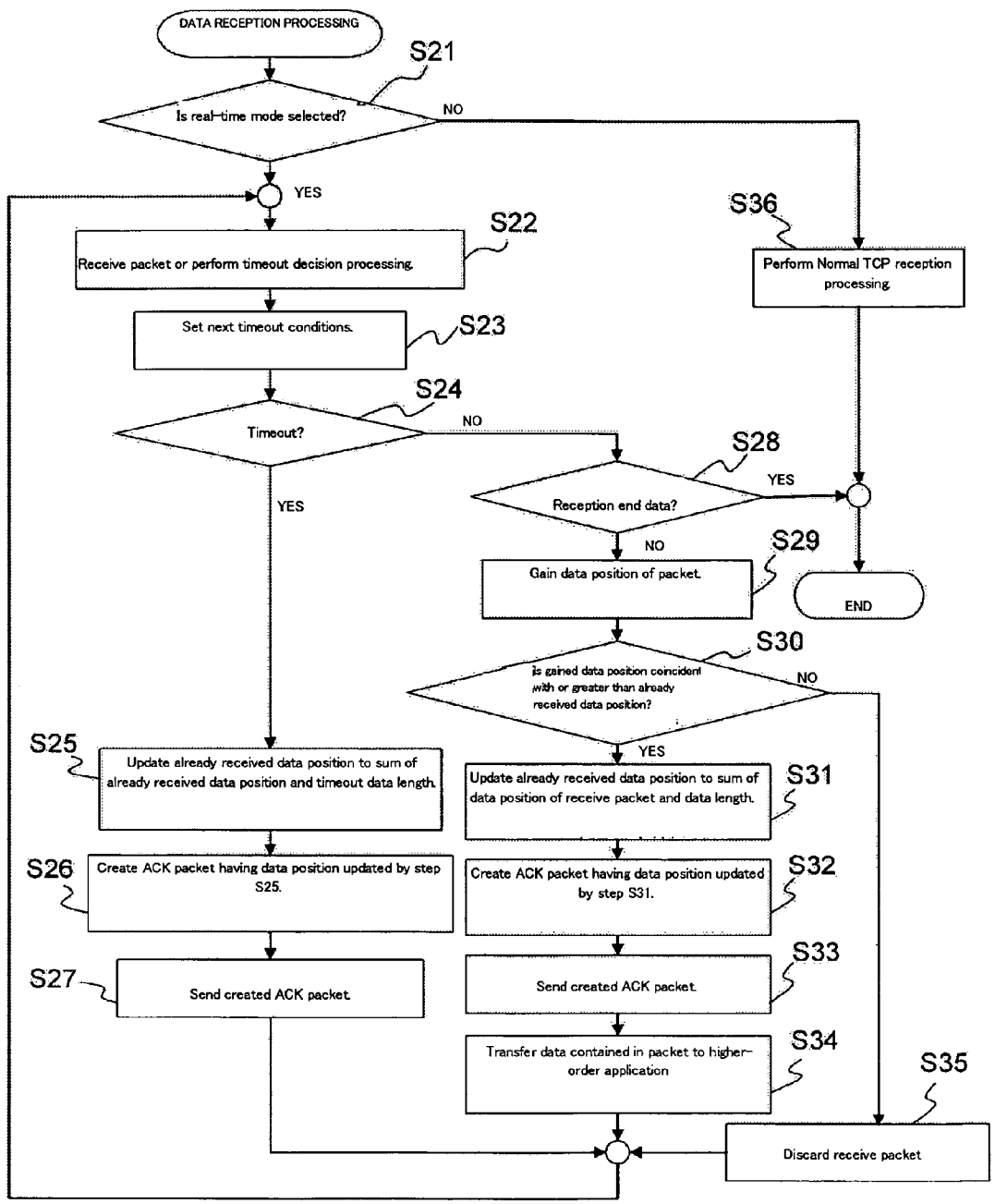
FIG. 7 is a flowchart illustrating a processing procedure of Embodiment 2 of the invention.

FIG. 7 is a flowchart illustrating the processing procedure of Embodiment 2 of the present invention. In the flowchart of FIG. 7, it is assumed that real-time mode is selected as the transmission mode (step S21). In the real-time mode, packets are received or timeout decision processing is performed (step S22).

Figure 8:
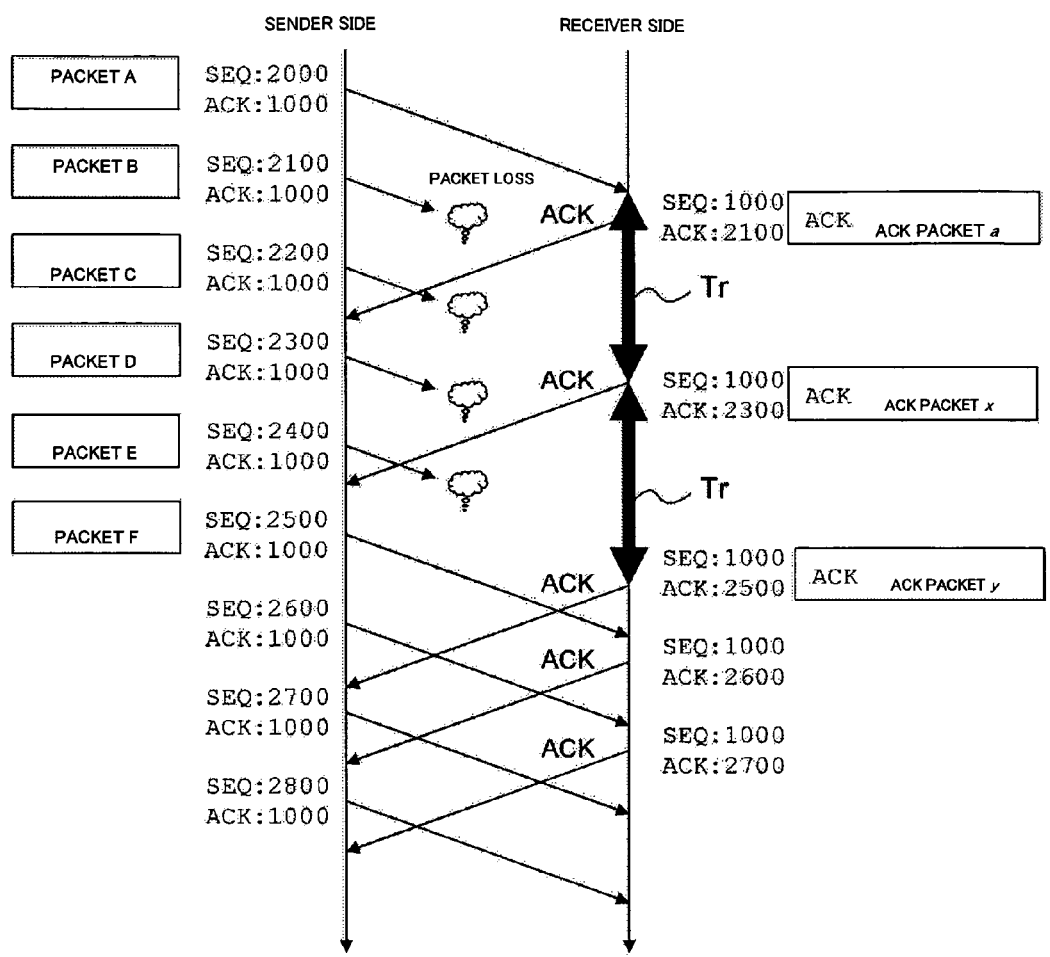
FIG. 8 is a diagram illustrating packet transmission operations of Embodiment 2 of the invention.

FIG. 8 is a diagram illustrating the packet transmission operation in Embodiment 2. In the embodiment of FIG. 8, a packet A sent from a sender unit arrives at a receiver unit without packet loss and so the packet A is first received. The reception of the packet A activates the timeout condition setting unit 11, and timeout conditions are set (step S23). The set timeout conditions are stored in the timeout condition storage unit 12.

The timeout conditions set by the timeout condition setting unit 11 consist of a timeout time that is a packet arrival maximum wait time and a timeout data length corresponding to the timeout time. The timeout time and timeout data length are stored in the timeout condition storage unit 12. In the embodiment of FIG. 8, the timeout data length is set to 200 bytes. A relation given by "timeout data length=timeout time×average transmission rate (average bit rate)" holds between the timeout data length and timeout time. The timeout time and timeout data length will be described in detail later.

The bold arrow Tr on the receiver unit of FIG. 8 indicates the timeout time. One feature of Embodiment 2 is that timeout processing is performed by the receiver unit.

With respect to the receive packet A, processing steps (steps S28-S34 in FIG. 7) similar to steps S3-S9 of Embodiment 1 shown in FIG. 3 are performed. An ACK packet a is created and sent to the sender unit. Data (data about voice and moving pictures) contained in the packet A is routed to a higher-order application.

Then, it is assumed that consecutive packet losses have caused the packets B, C, D, and E to produce packet losses as shown in FIGS. 5 and 8. This prevents the packets B, C, D, and E from arriving at the receiver unit. In Embodiment 2, a decision is made based on the timeout conditions for the receiver unit as to whether there is a timeout (step S24). This decision is performed by the timeout condition decision unit 13 which determines whether the timeout time stored in the timeout condition storage unit 12 has elapsed or not. If the time has elapsed, the data position updating unit 7 updates the already received data position stored in the data position storage unit 6.

The processing performed by the data position updating unit 7 to update the data position is described in further detail. First, the already received data position stored in the data position storage unit 6 is updated based on the timeout conditions. That is, the already received data position stored in the data position storage unit 6 is updated to a value obtained by adding the timeout data length stored in the timeout condition storage unit 12 to the already received data position (step S25). In this embodiment, the already received data position stored in the data position storage unit 6 is 2100 because of the reception of the packet A. Consequently, the data position is updated to the sum "2300" of the already received data position "2100" and the timeout data length ("200", in this example).

An ACK packet x having the updated data position is. created (step S26). That is, the ACK packet x having the data position "2300" that is the sum of the already received data position "2100" stored in the data position storage unit 6 and the timeout data length "200" is created.

The created ACK packet x is sent to the sender unit (step S27). This ACK packet x does not respond to an actually received packet. Rather, the packet x is created in spite of non-reception of a packet. Hence, the packet x is, so to speak, a pseudo ACK packet.

In particular, where a receive packet that should arrive at the receiver unit side does not arrive within a given time (within the timeout time), reception of the packet is not acknowledged in practice. In spite of this, the pseudo ACK packet is sent to the sender unit side as if the receiver unit received the correct packet. On the other hand, the sender unit side receives the pseudo ACK packet as a normal ACK packet. Therefore, if a packet results in a packet loss during the processing, retransmission responsive to the packet is not performed.

The program returns to step S22, where a packet is received or timeout decision processing (i.e., a decision as to whether there is a timeout) is made. In this case, no data is received from now on and so the timeout decision processing is performed.

As this timeout decision processing, next timeout conditions are first set (step S23). The set timeout conditions are stored in the timeout condition storage unit 12. Then, a decision is made as to whether there is a timeout in the same way as the foregoing processing (step S24).

If the result of the decision is that there is a timeout, the data position updating unit 7 updates the already received data position (in this embodiment, 2300) stored in the data position storage unit 6 to the sum (in this embodiment, 2500) of the already received data position (in this embodiment, 2300), and the timeout data length (in this embodiment, 200) (step S25).

An ACK packet y having the updated data position is created (step S26). That is, the ACK packet y having the data position that is the sum "2500" of the already received data position "2300" stored in the data position storage unit 6 and the timeout data length "200". The created ACK packet y is sent to the sender unit (step S27). This ACK packet y is a pseudo ACK packet similar to the ACK packet x.

The program returns to step S22, where a packet F is received. Then, next timeout conditions are set and stored in the timeout storage unit (step S23).

Thereafter, a decision is made as to whether there is a timeout in the same way as the foregoing processing (step S24). In this case, packets are received normally and so there is no timeout. Processing of steps S28 to S34, which is the same as the processing of steps S3 to S9 of FIG. 3, is performed.

If the condition that the data position of the receive packet is coincident with or behind the data position of the already received packet stored in the data position storage unit 6 is not satisfied in step S30, i.e., the packet arrives at the receiver unit with a very great delay for some cause, the delayed packet is discarded (step S35) in the same way as in FIG. 3.

Figure 16:
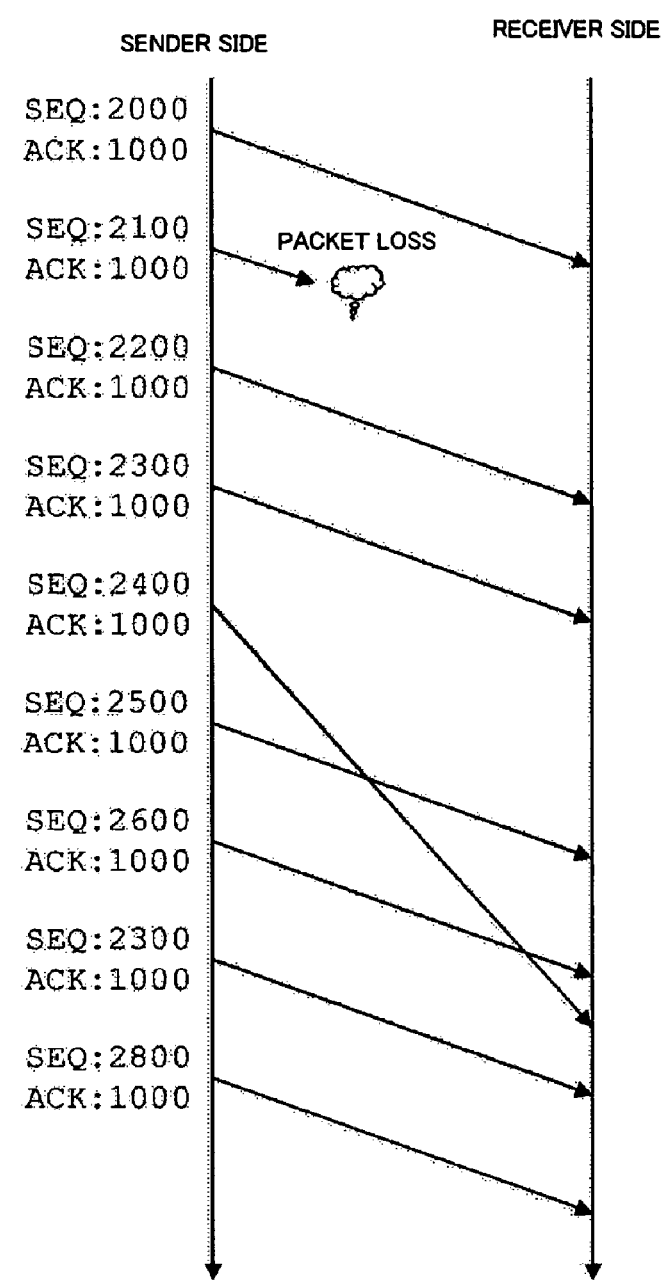
FIG. 16 is a diagram showing one example of packet transmission operation using UDP regarding IETF standard RFC768.

As can be appreciated from a comparison of FIG. 8 with the above-quoted FIG. 5, in Embodiment 2, the sender unit can transmit packets consecutively in spite of generation of a packet loss burst. This is adapted for real-time transmission in the same way as packet transmission using UDP illustrated in FIG. 16.

The timeout time used in Embodiment 2 is preferably set to or close to ((WIN/ABR)−RTT) seconds in a case where the window size is WIN bytes, the average transmission speed is ABR bytes/second, and the average reciprocation delay time of the transmission between the sender and receiver units is RTT seconds.

Figure 9:
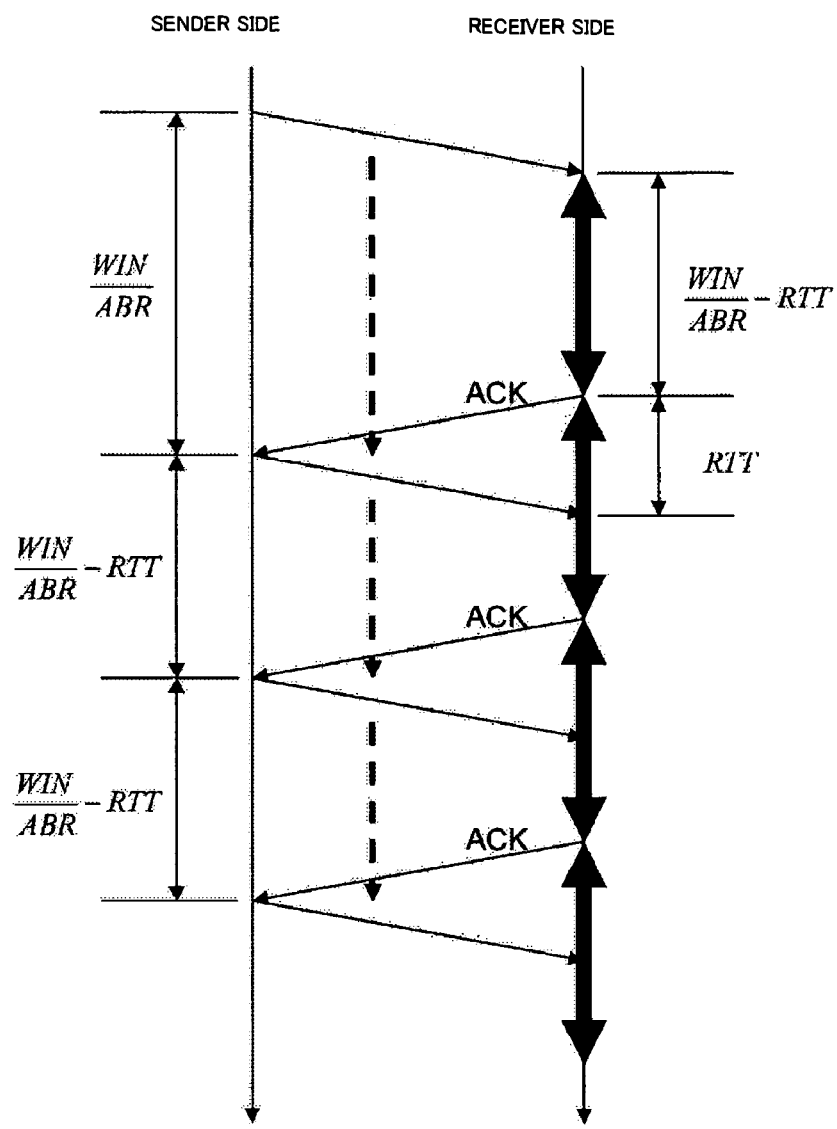
FIG. 9 is a diagram illustrating setting of timeout conditions used in Embodiment 2 of the invention.
Figure 12:
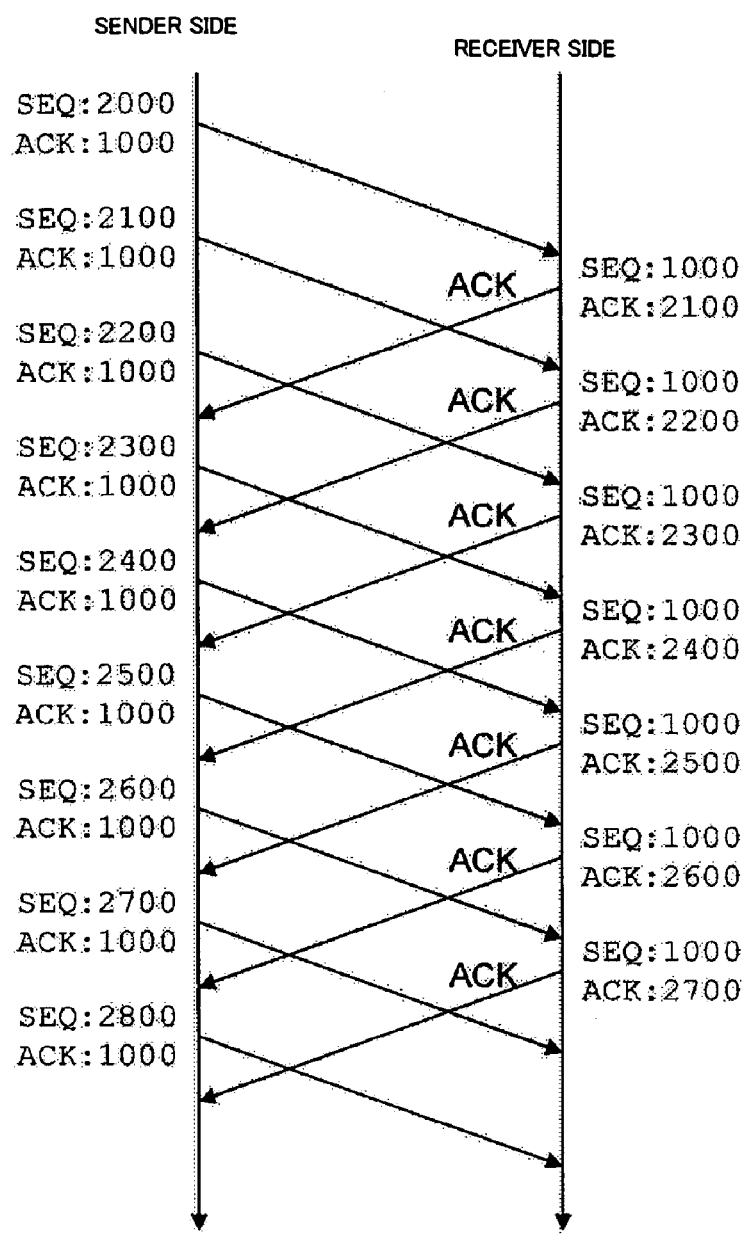
FIG. 12 is a diagram illustrating one example of packet transmission operation using TCP in a case where a given window size is set regarding IETF standard RFC793.

FIG. 9 is a diagram illustrating setting of timeout conditions used in Embodiment 2 of the present invention. As shown in the figure, the sender unit can continue the transmission only within the time of WIN/ABR without ACK reply. That is, if an ACK packet arrives within this time, the transmission can be continued thereby.

As shown in FIG. 9, in order that data arrive from the sender unit to the receiver unit and a corresponding ACK packet be received by the sender unit, a time of RTT seconds is necessary at minimum. That is, it can be considered that a maximum value of the timeout time necessary to continue the transmission is about ((WIN/ABR)−RTT) seconds. Accordingly, if the timeout time is set less than this value, continuous transmission is possible.

However, under circumstances where timeout occurs frequently, it is highly likely that packets arriving with delay due to variations in transmission delay are discarded. Therefore, the timeout time is preferably set to or close to the aforementioned maximum value ((WIN/ABR)−RTT) seconds. As can be appreciated from the description provided so far, the timeout data length that is appropriate at this time is the timeout time multiplied by the value of ABR.

This is again verified taking the configuration shown in FIG. 8 as an example. To simplify the explanation, it is assumed in FIG. 8 that one packet is sent per second. Data contained in one packet is 100 bytes herein. Therefore, the ABR (average transmission speed) is 100 bytes/second. In this case, WIN is set to 400 bytes. As can be seen from FIG. 8, RTT is about 2 seconds. Although these are unrealistic values, the generality of the explanation is not spoiled.

Inserting these values into the formula ((WIN/ABR)−RTT) results in a timeout time of ((400/100)−2)=2 seconds. In this embodiment, this corresponds to a transmission time for 2 packets and nearly corresponds to the length of the bold arrow indicating the timeout time of FIG. 8. Also, the timeout time corresponds to the timeout data length of 200 bytes corresponding to 2 packets.

In FIG. 8, an ACK packet created at the time of timeout uses the timeout data length. Using these values, the sender unit can continuously send even at the time of generation of consecutive packet losses as shown in FIG. 8.

As described so far, Embodiment 2 is based on the aforementioned Embodiment 1 and further characterized in that timeout decision processing is assigned to the receiver unit. In the prior art using TCP, the timeout decision processing is assigned to the sender unit.

In Embodiment 2, the timeout decision processing is assigned to the receiver unit to cope with burst packet losses occurring consecutively. Where no data arrives within the set timeout time, a pseudo ACK packet is created if no packet is received in practice. Suppression of transmission from the sender unit is prevented.

As a result, continuity of the transmission from the sender unit can be secured if burst packet losses are produced, in addition to the advantages obtained from Embodiment 1.

It is to be understood that the present invention is not limited to the above-described embodiments. Rather, they can be modified variously without departing from the gist of the invention. For example, in Embodiment 2, in a case where the packet A is received, the timeout time is set based on the starting point defined by the instant when the packet A is received in FIG. 8. The starting point may also be the instant when the ACK packet a responsive to the packet A is sent.

Furthermore, in the present invention, a processing program including a processing procedure for implementing the invention described so far may be created, and the program may be recorded in a recording medium such as a floppy disk, optical disk, or hard disk. The invention also embraces the recording medium in which the processing program has been recorded. In addition, the processing program may be obtained from a network.

What is claimed is:

1. A packet transmission system for successively sending source data from a sender unit after dividing the data into packets and for sending a receipt acknowledgment in response to each packet sent from a receiver unit that has received the receive packet to the sender unit, said receiver unit comprising:
a data position storage unit for storing a data position of each received packet on said source data;
a timeout condition setting unit for setting timeout conditions including a packet arrival maximum wait time;
a timeout condition decision unit for making a decision based on said timeout conditions as to whether there is a timeout; and
a receipt acknowledgment creation unit for creating a pseudo receipt acknowledgment based on the data position on said source data stored in said data position storage unit in a case where the timeout condition decision unit has determined that there is a timeout;
wherein said packet arrival maximum wait time is set approximately to ((WIN/ABR)−RTT) seconds, where an average transmission speed is ABR bytes/second, an average reciprocation delay time of transmission between said sender and receiver units is RTT seconds, and a window size having a data size capable of being sent continuously without waiting for a receipt acknowledgment is WIN bytes.

2. A packet transmission system as set forth in claim 1, wherein there is further provided a data position updating unit for updating the data position on said source data stored in said data position storage unit, and wherein said data position updating unit updates the data position on said source data stored in said data position storage unit to a data position that is obtained by adding a timeout data length corresponding to said packet arrival maximum wait time to the data position on said source data stored in said data position storage unit in a case where the timeout condition decision unit has determined that there is a timeout.

3. A packet transmission system as set forth in claim 2, wherein the receipt acknowledgment created by said receipt acknowledgment creation unit provides a description of a data position that is obtained by adding the timeout data length to the data position on said source data stored in said data position storage unit as a result of the update done by said data position updating unit.

4. A packet transmission system for successively sending source data from a sender unit after dividing the data into packets and for sending a receipt acknowledgment in response to each packet sent from a receiver unit that has received the receive packet to the sender unit, said receiver unit comprising:
a data position storage unit for storing data position of each received packet on said source data;
a timeout condition setting unit for setting timeout conditions including a packet arrival maximum wait time;
a timeout condition decision unit for making a decision based on said timeout conditions as to whether there is a timeout;
a receipt acknowledgment creation unit for creating a pseudo receipt acknowledgment based on the data position on said source data stored in said data position storage unit in a case where the timeout condition decision unit has determined that there is a timeout;
a data position updating unit for updating the data position on said source data stored in said data position storage unit, said data position updating unit updating the data position on said source data stored in said data position storage unit to a data position that is obtained by adding a timeout data length corresponding to said packet arrival maximum wait time to the data position on said source data stored in said data position storage unit in a case where the timeout condition decision unit has determined that there is a timeout;
wherein said timeout data length is set to said timeout time×ABR, where an average transmission speed is ABR bytes/second.

5. A packet transmission system as set forth in claim 1, wherein where the decision made by said timeout condition decision unit is that there is no timeout, the data position of each receive packet on said source data and data position on said source data stored in said data position storage unit are compared regarding each receive packet for which no timeout is found, and
wherein where the data position of said receive packet on said source data is judged to be behind the data position on the source data stored in said data position storage unit, a receipt acknowledgment is created.

* * * * *